(12) United States Patent
Feinleib

(10) Patent No.: US 6,637,032 B1
(45) Date of Patent: Oct. 21, 2003

(54) SYSTEM AND METHOD FOR SYNCHRONIZING ENHANCING CONTENT WITH A VIDEO PROGRAM USING CLOSED CAPTIONING

(75) Inventor: David Feinleib, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 08/779,270

(22) Filed: Jan. 6, 1997

(51) Int. Cl.⁷ .................................. H04N 5/445
(52) U.S. Cl. .................. 725/110; 348/564; 348/552
(58) Field of Search .................. 348/13, 12, 460, 348/461, 468, 563, 564, 565, 552; 345/327, 328; 725/109, 110, 112, 113, 111; H04N 5/445

(56) References Cited

U.S. PATENT DOCUMENTS

| | | | | |
|---|---|---|---|---|
| 5,559,949 A | * | 9/1996 | Reimer et al. | |
| 5,726,702 A | * | 3/1998 | Hamaguchi et al. | |
| 5,774,664 A | * | 6/1998 | Hidary et al. | |
| 5,809,471 A | * | 9/1998 | Brodsky | |
| 5,818,935 A | * | 10/1998 | Maa | |
| 5,832,223 A | * | 11/1998 | Hara et al. | |
| 5,946,050 A | * | 8/1999 | Wolff | 348/553 |

FOREIGN PATENT DOCUMENTS

| | | | |
|---|---|---|---|
| DE | 3143627 | * | 5/1983 |
| EP | 0 0723 369 A1 | | 7/1996 |
| JP | 58-209276 | * | 12/1983 |
| WO | WO 9602883 A1 | | 2/1996 |
| WO | WO 96/27840 | | 9/1996 |

OTHER PUBLICATIONS

Barnes, Mike, "Exploring the Vertical Blanking Interval," *Computer Applications Journal*, Apr. 1994.
"Intercast Industry Group Web Page," retrieved from World Wide Web at web site URL www.intercast.org.
"National Captioning Institute," retrieved from World Wide Web at web site ncicap.org/nci. Homepage and related web pages. Also includes text of Television Decoder Circuitry Act of 1990 (S. 1974).

* cited by examiner

*Primary Examiner*—David E. Harvey
(74) *Attorney, Agent, or Firm*—Lee & Hayes, PLLC

(57) ABSTRACT

A system and method uses the closed captioning script to synchronize supplemental data with specified junctures in a video program. A parser parses the closed captioning script to identify a set of unique phrases, with each phrase having the same number of words. A program producer decides what points in the video program to introduce enhancing content. The producer associates supplemental data used to activate the enhancing content with specific key phrases of the closed captioning script that correspond to the desired points in the program. The parser creates a key phrase data file which contains a listing of the key phrases and their association to the supplemental data. The key phrase data file is delivered to viewer computing units at users' homes. When the program is played, the viewer computing unit monitors the closed captioning script to detect the key phrases listed in the key phrase data file. Upon detection of a particular key phrase, the viewer computing unit accesses the key phrase data file to retrieve the supplemental data associated with the particular key phrase. The viewer computing unit executes an enhancement action according to the supplemental data to synchronize the enhancement action with the video program. According to one implementation, the key phrase detector multicasts the enhancement action to a multicast address. A listener in the form of an ActiveX™ control listens to the multicast address to receive and handle any enhancement action supported by the supplemental data. The listener can be embedded in a container, such as an HTML page or other hypermedia document.

50 Claims, 8 Drawing Sheets

HI HOW ARE YOU OH HI HOW ARE YOU I'M FINE THANKS — 140

HI HOW ARE YOU OH — 142

HOW ARE YOU OH HI — 144

ARE YOU OH HI HOW — 146

Fig. 8

SYSTEM AND METHOD FOR SYNCHRONIZING ENHANCING CONTENT WITH A VIDEO PROGRAM USING CLOSED CAPTIONING

TECHNICAL FIELD

This invention relates to systems and methods for synchronizing enhancing content with specific junctures in a video program. More particularly, the invention relates to systems and methods for synchronizing the enhancing content with the video program by using the closed captioning script of the video program.

BACKGROUND OF THE INVENTION

Conventional broadcast television is a non-interactive form of home entertainment. Television signals are broadcast one-way over a broadcast network from a television station or cable provider to home television sets. Viewers passively watch the video content played on the television sets, with their only interactivity being channel selection.

With computers, TV-based video games, and other multimedia environments, home users have become accustomed to interacting with the content being displayed. It is common for a computer user to selectively control what, when, and how content is displayed. For example, a computer user perusing a CD-ROM program on the Civil War might select a topic on Robert E. Lee. The computer user can use a mouse or other pointing device to page through various screens portraying the life of the General, read textual descriptions of Lee's achievements, click on icons to activate audio and video clips of reenacted war scenes. The whole experience is interactive.

The Internet offers an interactive multimedia environment. With the swift expansion and popularity of the Internet, many users are becoming familiar with "surfing" the World Wide Web ("Web" or "WWW") to locate information, conduct business transactions, obtain weather forecasts, conduct banking and other financial matters, shop for merchandise, and so forth. The user can locate and download files in essentially any data format (video, audio, graphical, text, etc.) from essentially anywhere in the world.

With such advances in interactive entertainment, there has been some effort to enhance traditional television video programming with supplemental content. One approach is to support a television broadcast with supplemental content made available on the Internet. As an example, MSNBC news, a cable news network jointly established by Microsoft Corporation and NBC, offers a 24-hour cable news program with concurrent postings at its Web site containing information supplementing the cable broadcast.

Many industry pundits believe that in the future the supplemental content will be offered concurrently with the broadcast television program on the same display device. For example, a home viewer watching an episode of Gilligan's Island on the television set might be able to access target resources on the Internet is which relate to Gilligan's Island, or other matters, from the same television set. It would be beneficial to present or make available the supplemental content at specific time slots in the episode. When Gilligan ruins the Skipper's hat, for example, a producer might want to display a hyperlink to a hat retailer for a brief interval while the episode continues to run. The user then has an opportunity to activate the link to call up the hat retailer web site and shop for a new hat.

One primary problem to enhancing traditional broadcast video programs concerns synchronizing presentation of the enhancing content with specific junctures or scenes in the video programs. In many cases, the enhancing content is not linked or associated with the video program in any useful manner. In the Gilligan example, a hyperlink to the hat retailer has no built in association to the video program Gilligan's Island. To compound the problem, the enhancing content will most likely not be provided from the same source as the video program.

The inventor has conceived of a technique for synchronizing presentation of the enhancing content with specific scenes in the video programs.

SUMMARY OF THE INVENTION

This invention concerns a system and method for synchronizing enhancing content with primary content, such as broadcast television programs, using the closed captioning script of the primary content. In this manner, enhancements to the primary content are timely introduced at preselected phrases or raw data strings of the closed captioning script, and hence at desired junctures of the primary content.

According to one aspect of the invention, a producer of enhancing content obtains the closed captioning script for a video program, such as a traditional broadcast television show, or a cable movie, or a program recorded on video cassette. The producer uses a parsing application to parse the closed captioning script to identify one or more key phrases. Preferably, the parser returns a set of unique phrases, with each phrase having the same number of words, or a unique data character string, with each character string having the same length of characters.

The program enhancement producer decides at what points in the video program to introduce enhancing content. As possible examples, the enhancing content might be a hyperlink to a target resource on the Internet, or manipulation of the video window with concurrent introduction of text or graphical data, or launching an application. After the program enhancement producer outlines the placement of the enhancing content within the video program, the producer uses an authoring computer to associate supplemental data (e.g., a URL, a file name, etc.) used to activate the enhancing content with specific key phrases or character strings of the closed captioning script that correspond to the desired points in the program. The authoring computer creates a key phrase data file which contains a listing of the key phrases or character strings and their association to the supplemental data.

The key phrase data file is delivered to viewer computing units (e.g., personal computer, television with set top box, etc.) at users' homes. For example, the data file can be delivered over the broadcast network used to transport the video program, over the Internet or other network, or through the mail on a storage disk.

When the program is played, a viewer computing unit equipped with the key phrase data file for that program begins to monitor the closed captioning script. The viewer computing unit has a key phrase detector to detect the key phrases or character strings listed in the key phrase data file. In one implementation, the key phrase detector is a parser which examines sequential groupings of words or characters and compares the groupings with the key phrases in the data file to identify the key phrases. Upon detection of a particular key phrase, the key phrase detector accesses the key phrase data file to retrieve the supplemental data associated with the particular key phrase. The viewer computing unit executes an enhancement action according to the supplemental data to synchronize the enhancement action with scenes in the video program.

According to one implementation, the key phrase detector multicasts the enhancement action to a multicast address. A program enhancement listener listens to the multicast address to receive and handle any enhancement action supported by the supplemental data. The listener can be implemented as an ActiveX™ control embedded in a container, such as an HTML page, or as an application. Using multicasting as an interprocess communication tool within the viewer computing unit effectively decouples the key phrase detection activity from the content enhancement activity, allowing the content enhancement producers to concentrate only on what enhancement actions to make in conjunction with the supplemental data.

BRIEF DESCRIPTION OF THE DRAWINGS

FIG. 8 illustrates the operation of a closed captioning parser resident at the viewer computing unit to identify key phrases in the closed captioning script.

DETAILED DESCRIPTION OF THE PREFERRED EMBODIMENT

Conventional broadcast television signals are transmitted in a data format that is used to construct individual television frames. Each frame contains video image data (i.e., pixel data) used to create images on the television screen and non-image information used to control the presentation of the image, such as synchronization and timing information. The non-image information is primarily contained within the first twenty-one lines of the television frame. These upper twenty-one lines are referred to as the Vertical Blanking Interval (VBI), and are not displayed on the television. Instead, these lines coincide with the vertical refresh period in which the cathode ray tube of the television set is moved from the lower right hand corner of the screen upon completion of one frame to the upper left hand corner of the screen for commencement of the next frame.

Closed captioning data is broadcast in line 21 of the VBI. The closed captioning data provides a textual script of the audio content in the program. The textual script can be displayed concurrently with the program to assist a deaf or hearing impaired audience understand the character dialog or narration.

The Television Decoder Circuitry Act of 1990 requires that all televisions made after 1993 of a size 13 inches or larger be equipped with closed captioning decoding circuitry. Newer video cassette recorders are also designed to capture and replay the closed captioning data for a closed captioning enabled program. As a result, closed captioning data is becoming increasingly prevalent on broadcast television shows, syndicated shows, cable movies, and pre-recorded programs on video cassettes or digital video disks. The National Captioning Institute in Washington, D.C. estimates that nearly 100% of prime time television shows and between 60%–70% of syndicated shows have closed captioning.

An aspect of this invention concerns exploiting closed captioning as a means to synchronize the presentation of enhancing content to specific dialog sequences in a program.

Figure 1:
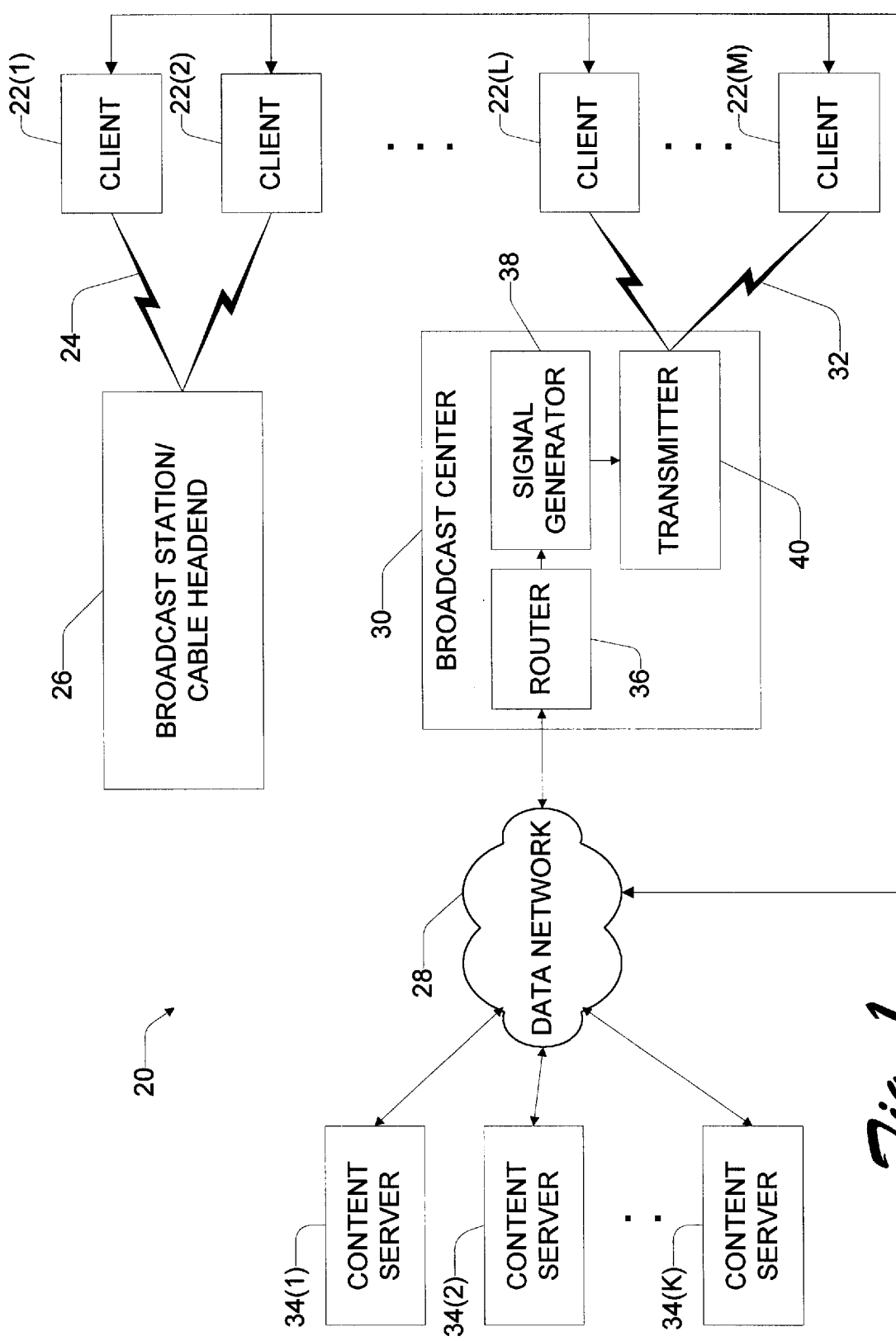
FIG. 1 is a diagrammatic illustration of a system for delivering both primary and enhancing content to viewer computing units.

FIG. 1 shows a system 20 which provides an exemplary context for implementing aspects of the invention. System 20 provides a data delivery architecture for delivering primary content along with supplemental or enhancing content to multiple viewer computing units, or clients 22(1), 22(2), . . . , 22(L), . . . , 22(M). The primary content is the main program to be presented to the viewer, and it supports a closed captioning script. One notable example of primary content is continuous video data. Broadcast television shows, transmitted cable shows, pre-recorded movies on video cassettes or digital video disks (DVDs), live media feeds (e.g., news, sports, debates, etc.), and the like are all examples of primary content in the form of continuous video programs that are often closed captioning enabled.

The clients 22(1)–22(M) can be implemented in a number of ways, including desktop computers, laptop computers, and computer enhanced television units (e.g., a television with a set top box, a television with set top box functionality built in, etc.). An example implementation in which a client is constructed as a broadcast-enabled personal computer is described below with reference to FIG. 6.

In the FIG. 1 implementation, the primary content is delivered to the clients 22(1)–22(M) in one of two ways. The first way is to broadcast the primary content over a conventional broadcast network 24 (e.g., RF, satellite, cable, microwave, etc.) from a broadcast station or cable headend 26. This is the typical approach to delivering television and cable shows to audiences.

A second way is to deliver the primary content over a data network 28, such as the Internet, to a broadcast center 30, which then delivers the primary content over a unidirectional network 32 to the clients 22(1)–22(M). The data network 28 can be implemented in a number of ways, including wire-based technologies (e.g., fiber optic, cable, wire, etc.) and wireless technologies (e.g., satellite, RF, microwave, etc.). The data network 28 can further be implemented using various available switching technologies (e.g., ATM (Asynchronous Transfer Mode), Ethernet, etc.) and different data communication protocols (e.g., TCP/IP, IPX, etc.). In such protocols, the data is packaged in individual, fixed byte-size packets which are transmitted separately over the data network. The unidirectional network 32 can be implemented in a variety of ways, including conventional networks such as satellite, radio, microwave, cable, and so forth. The broadcast network 32 might also be implemented as a network which supports two-way communication, but can be used for unidirectional multicasting from the broadcast center 32 to the clients 22(1)–22 (M) simultaneously.

For the second approach, one or more content servers 34(1)–34(K) serve the primary content over the data network 28 to the broadcast center 30. Content servers used to serve the primary content might be configured, for example, as continuous media file servers which serve data files at a constant data rate. An exemplary construction of a file server comprises a disk array of storage disks, with the data files striped across the storage disks, and one or more servers which cooperate together to serve the data files from the storage disks.

The broadcast center 30 includes a router 36, a signal generator 38, and a broadcast transmitter 40. The router 36 is coupled to the data network 28 to receive the content served from the content servers 34(1)–34(K). The router 36 is a final node of the data network 28 in which data communication is bi-directional to that point and unidirectional past that point. The router 36 is preferably configured as a bridge-router between the traditional data network 28 and the broadcast network 32. A bridge-router is capable of supporting video and audio broadcast transmission. Data is received at the router 36 and converted from the network packet format to a format appropriate for broadcast transmission. The signal generator 38 generates a broadcast signal with the data embedded thereon to carry the data over the broadcast network 32. The broadcast signal is passed to the transmitter 40 where it is broadcast over the broadcast network 32 to the clients 22(1)–22(M).

System 20 also allows for the delivery of enhancing content to the clients 22(1)–22(M). The enhancing content is used to enhance the primary content. The enhancing content can be supplied to the clients 22(1)–22(M) over the broadcast networks 24, 32, or over the data network 28 from the content servers 22(1)–22(K). One or more of the content servers 34(1)–34(K) are used to serve the enhancing content, which may be in the form of audio, video, animation, bit maps or other graphics, applications or other executable code, text, hypermedia, or other multimedia types. As an exemplary implementation, the content servers 22(1)–22(K) used to serve the enhancing content are implemented as personal computers or workstations running a multitasking, disk-based operating system, such as Windows® NT from Microsoft Corporation.

As an alternative, the enhancing content might reside on a storage medium at the viewer's home, such as on a computer disk or a CD-ROM, which can be accessed during the playing of the primary content.

One example of enhancing content is a hyperlink that is timely displayed at a certain juncture of the primary content to allow a viewer to activate the hyperlink and access a target resource on the Internet which has additional or related information to the primary content. For instance, suppose the primary content is a television episode of Seinfeld, in which the character Jerry Seinfeld is wearing Levi® jeans. When Seinfeld first appears in a scene, a content enhancing producer might wish to timely introduce a URL (Universal Resource Locator) to a Web Page for Levi Strauss Corporation that has information about the particular Levi® jeans that Seinfeld is wearing.

Another example of enhancing content is to manipulate the manner in which the primary content is being displayed. For instance, a content producer might wish to modify the video window in which the primary content is being displayed and concurrently introduce text or graphical data alongside or overlaid atop the primary content. One possible implementation is to launch an Internet Web browser which presents a hypermedia document, such as an HTML (HyperText Markup Language) page. Within the hypermedia document, the producer can specify display layout instructions prescribing how the enhancing content and primary content are to appear in relation to one another when displayed. A detailed description of this implementation is provided in co-pending application Ser. No. 08/623,610, entitled "Interactive Entertainment System For Presenting Supplemental Interactive Content Together With Continuous Video Programs," filed Mar. 29, 1996, in the names of Dan Shoff, Valerie Bronson, Joseph Matthews, III, and Frank Lawler, and assigned to Microsoft Corporation. This application is hereby incorporated by reference.

Another example of enhancing content is to launch an application, such as a Web browser, or a word processing application, or electronic mail. For instance, suppose the primary content is a political discussion program. Near the end of the program, the producer would like to gather feedback from the viewing audience regarding the issues discussed on the show. Accordingly, the producer might timely launch an electronic mail program at a specific point near the end of the program to present a new mail message with the "To" address filled in. The viewer can add comments and send the e-mail message to the program's producer for immediate feedback.

An aspect of this invention concerns a technique for synchronizing the enhancing content with the primary content in a manner which is independent of how and when the enhancing content, or the primary content, are delivered to the viewer computing units. The technique takes advantage of the closed captioning script as the timing mechanism for synchronizing introduction of the enhancing content relative to the primary content.

In general, a content enhancing producer obtains the closed captioning script of the primary content and relates key phrases or unique character strings from the script to supplemental data used to activate the enhancing content. Then, while the primary content is playing, the clients monitor the closed captioning dialog to detect the key phrases or character strings and to activate the enhancing content. In this manner, the enhancing content is presented at specific dialog sequences monitored in the closed captioning script, which coincide with particular junctures in the primary content.

Figure 2:
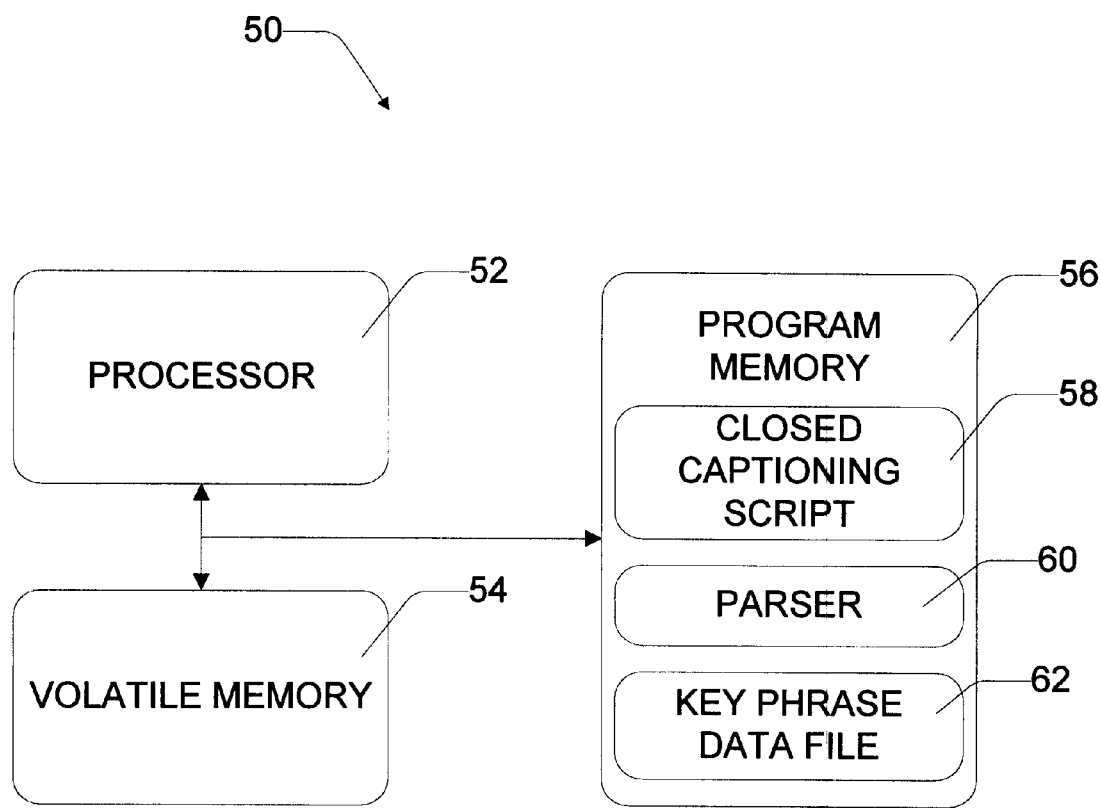
FIG. 2 is a block diagram of an authoring system for producing an enhanced program in which enhancing content is synchronized to key phrases in a closed captioning script of the program.

FIG. 2 shows a computerized authoring system 50 which can be used by a content enhancing producer to create enhanced programs in which enhancing content is synchronized with scenes in a video program or other primary content. Authorizing system 50 is shown implemented as a personal computer or workstation having a processor 52, volatile memory 54 (e.g., RAM), and program memory 56 (e.g., hard disk, floppy disk, flash, ROM, etc.). An electronically readable version of the program's closed captioning script 58 is loaded into the program memory 56. A parser 60 is shown implemented as a computer software program stored in memory 56 and executable on the processor 52.

Figure 3:
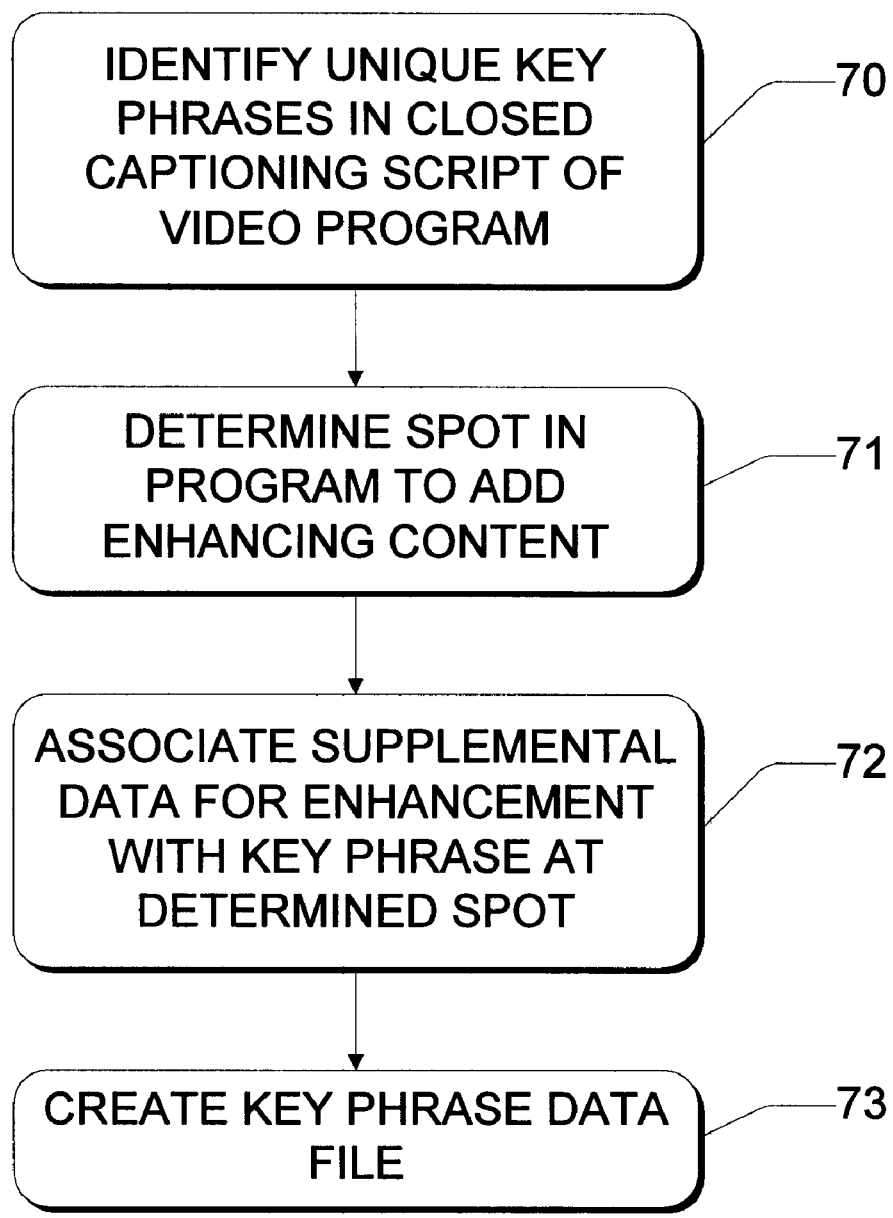
FIG. 3 is a flow diagram of steps in a method for producing an enhanced program according to one implementation.

FIG. 3 shows a method for producing an enhanced program using the authoring system 50. The producer first obtains a copy of the closed captioning script for a program and loads the closed captioning script 58 in the authoring computer 50. At step 70 in FIG. 3, the parser 60 parses the closed captioning script 58 to identify one or more key phrases. The parser 60 is configured to compile a set of unique key phrases. Preferably, each key phrase has the same number of words. Consider the following example of a greeting dialog between two characters as presented in a fictional closed captioning script:

Hi, how are you?
Oh, hi how are you?
I'm fine thanks.

The parser 60 first determines the minimum number of words required to create unique phrases by trying different word lengths and checking for duplication. In this example, five word phrases are used. Phrases having a four or less word length result in duplication. For instance, the four word phrase "hi how are you" is duplicated in the short dialog.

Once the minimum length is determined, the parser 60 returns a set of unique phrases with each new phrase starting at sequential words in the dialog. From the above greeting dialog, the parser 60 returns the following set of unique phrases:

hi how are you oh
how are you oh hi
are you oh hi how
you oh hi how are
oh hi how are you
hi how are you i'm
how are you i'm fine
are you i'm fine thanks The parser 60 can also be configured to create unique character strings from the raw closed captioning data. For instance, for the text "Hi, how are you?", the raw data might be "@!)(HI&,%!HOW~!@#ARE&!!YOU". The non-alphanumeric characters are control characters which prescribe the positioning and formatting information. The parser 60 creates unique character strings that have the same character length. Rather than keying on the words themselves, the raw character stream is monitored to find the unique character strings.

For purposes of this disclosure, the term "phrase" is meant to include both word sequences of text (e.g., "oh hi how are you") and character strings of raw data (e.g., "!!OH@!)(HI&,%!HOW~!@").

After compiling the key phrases, the parser 60 outputs a file containing the set of unique phrases.

It is noted that, rather than the parser 60, other types of key phrase identifiers can be used to identify key phrases in the closed captioning script. For example, the processor might be directed to search the closed captioning script for a single word, or a set of words, spoken by one or more characters to which the producer wants to introduce enhancing content.

At step 71 in FIG. 3, the producer determines at which point in the program to insert enhancing content. Suppose, for example, the author wants to display a hyperlink to a Web site for a greeting card company during the greeting scene in the video program. The author might choose the phrase "oh hi how are you" as the trigger for displaying the hyperlink. Accordingly, the author uses the authoring computer 50 to insert supplemental data in the form of a URL at the appropriate place in the closed captioning script. The revised script might read:

Hi, how are you?
Oh, hi how <www.greetingcardco.com> are you?
I'm fine thanks.

After the producer has added all the enhancing content, the authoring computer 50 extracts the supplemental data and associates them with the corresponding key phrases (step 72 in FIG. 3). In this example, the authoring computer 50 retrieves the URL "www.greetingcardco.com" from the parser output file and links or otherwise associates it with the phrase "oh hi how are you" as follows:

oh hi how are you=www.greetingcardco.com

As another example, suppose the author wants to launch an application at the response "I'm fine thanks." The authoring computer 50 might create the association:

are you i'm fine thanks=application.exe

At step 73 in FIG. 3, the authoring computer 50 creates a key phrase data file which contains the supplemental data associated with the key phrases. This key phrase data file, referenced as number 62 in FIG. 2, is stored in memory 56 during creation. The key phrase data file is subsequently given to the viewer computing units 22(1)–22(M) for use in decoding the closed captioning script when the primary content is playing to enhance the primary content.

The FIG. 3 method creates a data file containing a list of all unique key phrases in the closed captioning script. In another implementation, the authoring computer 50 automatically creates a reduced set of key phrases, on an "as needed" basis, which correspond to specific discrete points in the script for introduction of enhancing content.

Figure 4:
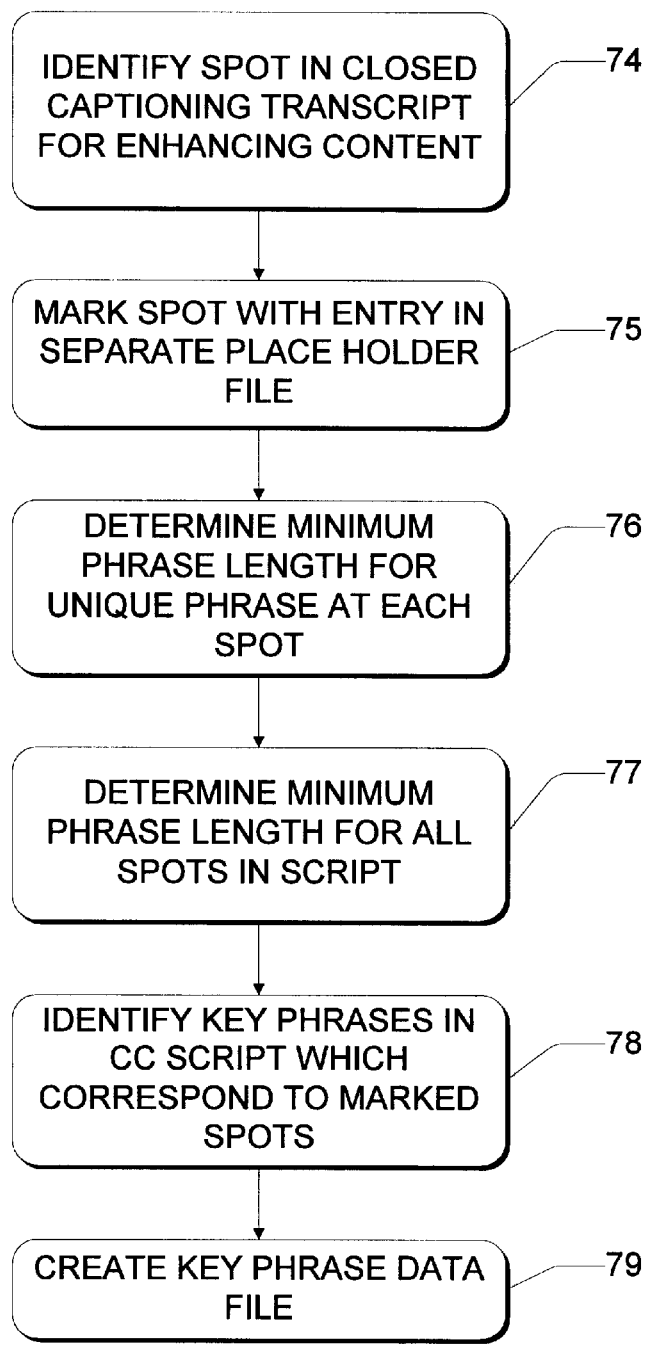
FIG. 4 is a flow diagram of steps in a method for producing an enhanced program according to another implementation.

FIG. 4 shows the alternative method for producing an enhanced program using the authoring system 50. As before, the content enhancing producer obtains a copy of the closed captioning script 58 and loads it in the authoring computer 50. At step 74, the producer reads through the closed captioning script (and perhaps, concurrently views the program) and identifies spots in the script for introducing enhancing content. The producer might identify such spots by simply clicking a mouse button at the particular place as the script is running. In response, the authoring computer marks the identified spot with an entry in a separate data file (step 75). The entry specifies the byte offset from the start of the script, as follows:

byte offset into script file <tab> {place-holder 1} next byte offset into script file <tab> {place-holder 2}

This new place holder data file contains references to a set of discrete points in the closed captioning script at which the producer intends to introduce enhancing content. The placeholders are monotonically incremented for each entry, and will eventually be replaced with the supplemental data for the enhancing content, such as a URL, trigger, or application name.

At step 76 in FIG. 4, the parser 60 determines a minimum phrase length need to uniquely identify phrases at the discrete points of the script. For a given point, the parser returns a minimum phrase length necessary to uniquely identify that point in the script. The parser then determines an overall minimum phrase length based on the minimum lengths for each point (step 77 in FIG. 4). That is, the minimum phrase length for the script is equal to the maximum phrase length for any given point entry in the place holder file. The minimum phrase length may be expressed in terms of a number of words, or a number of characters, or a number of bytes.

Using the place holder file and minimum phrase length, the authoring computer traverses the closed captioning script and automatically identifies key phrases of the prescribed length at the selected spots in the script (step 78 in FIG. 4). For each entry in the place holder file, the authoring computer skips to the byte offset in the script, and identifies a key phrase having the minimum phrase length at that particular spot. This key phrase is then associated with the placeholder, or supplemental data related to the place holder. As a result, the authoring computer automatically generates the key phrase data file 62 containing the key phrases associated with the supplemental data (step 79 in FIG. 4).

Figure 5:
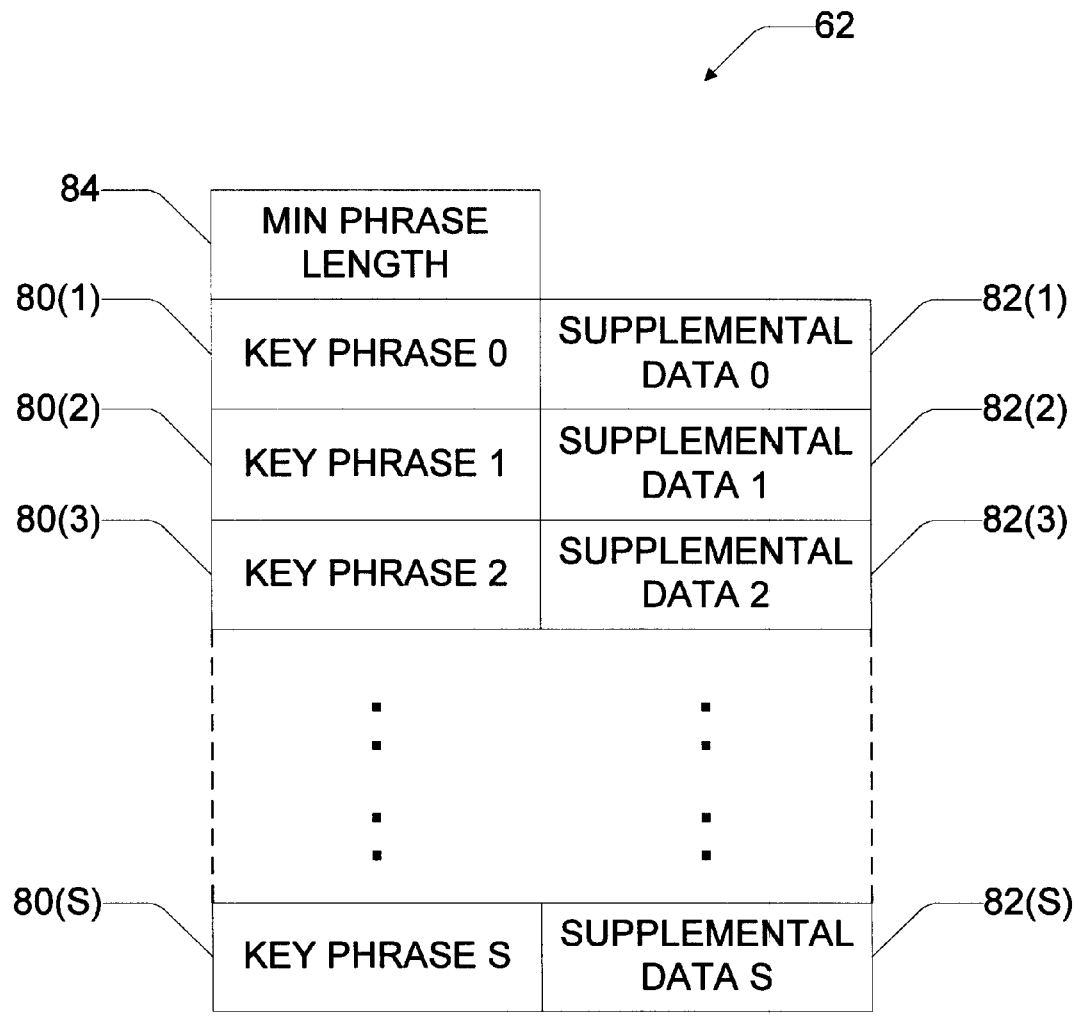
FIG. 5 is a diagrammatic illustration of a key phrase data structure which associates the key phrases of the closed captioning script with supplemental data used to enhance a program.

FIG. 5 shows an exemplary data structure for the key phrase data file 62. The data structure 62 includes key phrase data fields 80(1), 80(2), . . . , 80(S) which contain key phrases 0-S that have been abstracted from a closed captioning script for use as enhancing content triggers. It is noted that the authoring computer might compute hashes of the key phrases to reduce the size of the data file and improve matching speed at the client.

The data structure 62 also has supplemental data fields 82(1), 82(2), . . . , 82(S) which contain supplemental data 0-S for enhancing the primary content. The key phrase data structure 62 is organized in a manner that associates supplemental data 0-S in the supplemental data fields 82(1)–82(S) with corresponding key phrases 0-S in the key phrase data fields 80(1)–80(S). The key phrase data structure 62 also has a minimum phrase length data field 84 which contains the minimum number of words or minimum number of characters (or data bytes) in each key phrase 0-S.

According to the above implementations, the supplemental data is not actually added to the closed captioning script. Rather, the author creates a separate data file 62 that associates key phrases appearing in the closed captioning script with supplemental data used to call enhancing content. This is advantageous because the enhanced content producers can be independent of the producers of the primary content. The enhanced content producers merely need a copy of the closed captioning transcript to aid them in creating the enhancing content, but they do not ever change or modify the closed captioning transcript. Hence, they can operate independently of the primary content producers.

Another advantage is that the closed captioning script is almost always carried with the primary content to the end viewer, even though other lines of the Vertical Blanking Interval may be stripped away during rebroadcast. The enhancing content can be delivered independently of the primary content and synchronized at the viewer computing unit using the closed captioning script which accompanies the primary content. Additionally, most modern video cassette recorders are designed to capture the closed captioning script along with the primary content during recording. Thus, even during playback of a recorded program, the closed captioning script is present to provide the timing mechanism for the enhancing content.

The key phrase data file created by the content enhancing producer is supplied to interested viewers. The key phrase data file can be delivered in a number of ways, such as broadcasting the file over the broadcast network used to carry the primary content, or multicasting the file to a multicast address to which the client listens, or posting the file at a publicly accessible Web site on the Internet, or supplying the file to the viewer on a computer disk or other storage medium.

In another implementation, the supplemental data might be embedded directly in the closed captioning script, rather than being linked to the key phrases through a data file. In this implementation, the producer inserts the supplemental data at key phrases in the transcripts. The supplemental data is formatted to be identified as such, so that the viewer computing unit does not display the supplemental data as part of the closed captioning text. Exemplary modifications that could be made to the closed captioning script include insertion of hyperlinks in the closed captioning script, insertion of replaceable key-phrases with monikers, and insertion of hidden or special characters to which supplemental data is keyed. However, embedding supplemental data directly into the transcript is in some ways less preferable because it requires cooperation between the primary content producers and the enhanced content producers. As a result, the enhanced content producers lose some of their freedom to create, while other enhanced content producers may be prevented from participating at all.

In another embodiment, the authoring computer system might be configured to write out the entire closed captioning script along with timing information of the script relative to the video content (e.g., frame numbers). The closed captioning is stored as a text file, and the video is stored in a digital format, such as an AVI file. For each word in the closed captioning transcript, the authoring system writes the associated video frame number. The producer can then select places to insert enhancing content using the video itself, with the authoring system linking the enhancing content to the appropriate phrases in the closed captioning script.

Now, suppose that a viewer decides to watch a particular primary content that is capable of being enhanced. For purposes of continuing discussion, suppose that the primary content is delivered over a broadcast network and that the viewer has already been supplied with the key phrase data file 62.

Figure 6:
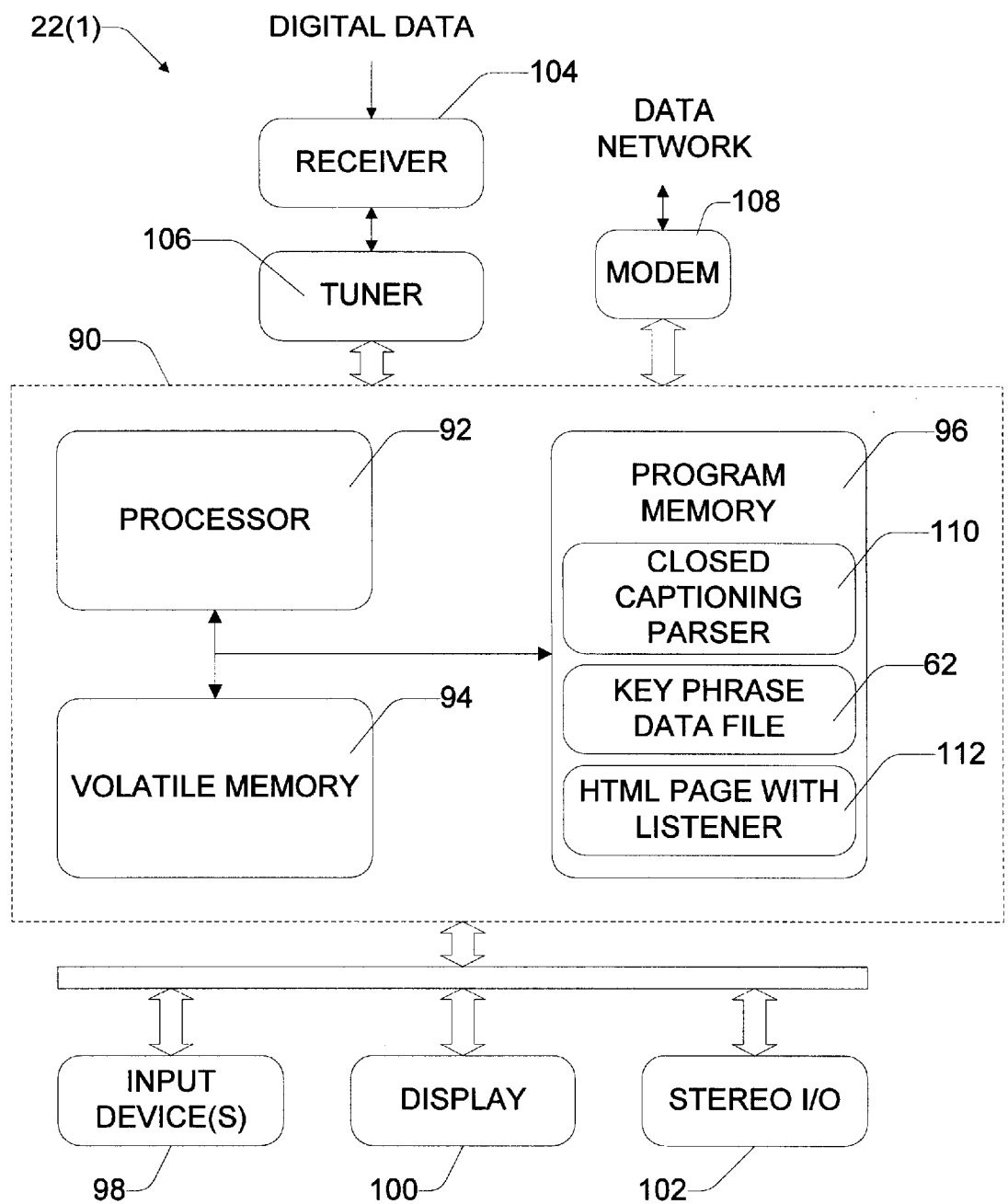
FIG. 6 is a block diagram of a viewer computing unit.

FIG. 6 shows a viewer computing unit or client 22(1) constructed as a broadcast-enabled computer according to one exemplary implementation. It includes a central processing unit 90 having a processor 92 (e.g., X86 or Pentium® microprocessor from Intel Corporation), volatile memory 94 (e.g., RAM), and program memory 96 (e.g., ROM, disk drive, floppy disk drive, CD-ROM, etc.). The client 22(1) has one or more input devices 98 (e.g., keyboard, mouse, etc.), a computer display 100 (e.g., VGA, SVGA), and a stereo I/O 102 for interfacing with a stereo system.

The client 22(1) includes a broadcast receiver 104 (e.g., satellite dish receiver, RF receiver, microwave receiver, multicast listener, etc.) and a tuner 106 which tunes to appropriate frequencies or addresses of the broadcast network 24, 32 (FIG. 1). The tuner 106 can be configured to receive the primary content in a particularized format, such as MPEG-encoded digital video and audio data. The client 22(1) also has a modem 108 which provides access to the data network 28 (FIG. 1). For other implementations, the modem 58 might be replaced by a network card, or an RF receiver, or other type of port/receiver which provides access to a compatible data network.

The client 22(1) runs an operating system (not shown) which supports multiple applications. The operating system is preferably a multitasking operating system which allows simultaneous execution of multiple applications. The operating system employs a graphical user interface windowing environment which presents the applications or documents in specially delineated areas of the display screen called "windows." One preferred operating system is a Windows® brand operating system sold by Microsoft Corporation, such as Windows® 95 or Windows® NT or other derivative versions of Windows®. It is noted, however, that other operating systems which provide windowing environments may be employed, such as the Macintosh operating system from Apple Computer, Inc. and the OS/2 operating system from IBM.

One example implementation of a broadcast-enabled PC is described in a co-pending U.S. patent application Ser. No. 08/503,055, entitled "Broadcast-Enabled Personal Computer," filed Jan. 29, 1996 in the names of Gabe L. Newell, Dan Newell, Steven J. Fluegel, David S. Byrne, Whitney McCleary, James O. Robarts, Brian K. Moran; William B. McCormick, T. K. Backman, Kenneth J. Birdwell, Joseph S. Robinson, Alonzo Gariepy, Marc W. Whitman, and Larry Brader. This application is assigned to Microsoft Corporation, and is incorporated herein by reference.

The client 22(1) is illustrated with two software programs: a closed captioning parser 110 and an HTML page with an embedded multicast listener 112. Each program is stored in program memory 96, loaded into volatile memory 94 when launched, and executed on the processor 92. The key phrase data file 62 is also shown stored in the program memory 96. The closed captioning parser 110 is configured to monitor the closed captioning script as the video program is played to detect the key phrases listed in data file 62.

Figure 7:
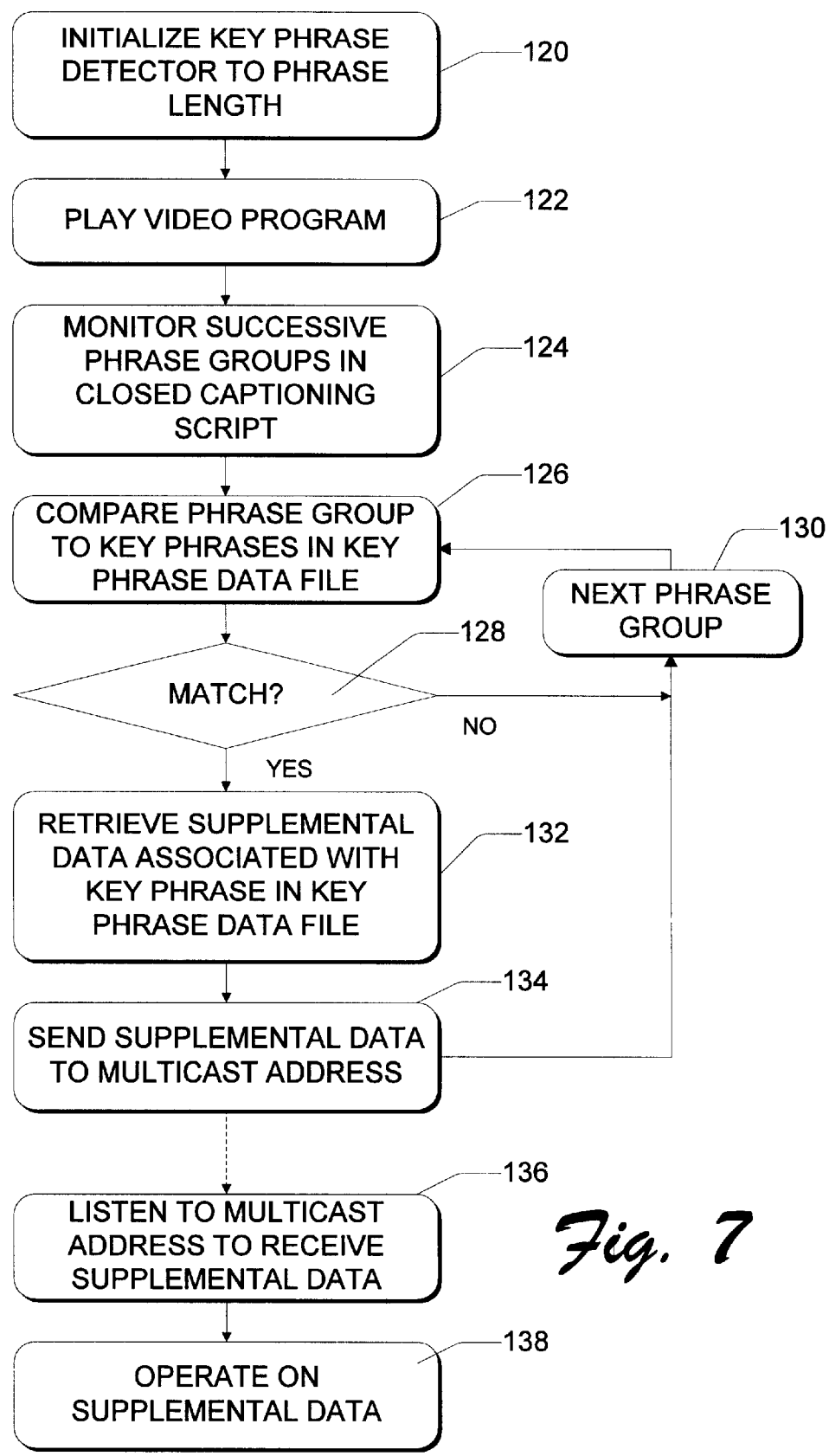
FIG. 7 is a flow diagram of steps in a method performed by the viewer computing unit for enhancing primary content with enhancing content.

FIG. 7 shows a method for enhancing the primary content with supplemental data. At step 120, the client prepares for playing an enhanced program by initializing the closed captioning parser 110 to the minimum word length or character count of the key phrases. This initialization sets the parser 110 to monitor the closed captioning script in successive groups of words equal to this word length or character strings equal to the character count. The client obtains the key phrase word length from the minimum phrase length data field 84 of the data structure 62 (FIG. 5).

At step 122 in FIG. 7, the client 22(1) plays the primary content on the display 100. In this example, the receiver 104 receives the primary content from the broadcast network and passes it to the central processing unit 90. The CPU 90 strips the non-video data in the Vertical Blanking Interval and passes the video data to video display drivers for presentation on the display 100. The primary content contains a closed captioning script which is contained as part of the Vertical Blanking Interval. The text of the closed captioning script may or may not be displayed on display 100 concurrently with the primary content in customary fashion.

As the primary content plays, the closed captioning parser 110 monitors the successive word groups in the closed captioning script (step 124 in FIG. 7). The parser 110 compares each word group with the list of key phrases in the key phrase data fields 80(1)–80(S) of the data structure 62 (step 126 in FIG. 7). If no match occurs (i.e., the "no" branch from step 128), the parser 110 continues to the next word group (step 130). It is noted that, if the data file contains hash values of the key phrases, the parser 110 may need to compute hashes of each word group for comparison to the stored hash values.

FIG. 8 illustrates this process for parsing the closed captioning script using the greeting dialog from the examples given above. The parser 110, which is initialized to a word length of five, examines successive groups of five words in the closed captioning script 140. The first group 142 is the five word phrase "hi how are you oh." This phrase is compared to the key phrases in data structure 62 and no match occurs. Thus, the parser 110 moves to the next group 144 which provides the five word phrase "how are you oh hi." Once again, the phrase is compared to the key phrases and no match occurs. The process is repeated for the next group 146, and for successive groups thereafter.

When a group of words matches a key phrase in the data structure 62 (i.e., the "yes" branch from step 128), the parser 110 looks up in the data file for the supplemental data corresponding to the matched key phrase. In this manner, the data file is utilized as an association look-up table. The supplemental data is associated with the key phrases through the inherent corresponding field arrangement of the data structure 62. The parser 110 retrieves the supplemental data from the key phrase data file 62 (step 132 in FIG. 7). In the continuing example, the parser 110 detects the phrase "oh hi how are you" which matches a key phrase stored in data structure 62. The parser then retrieves the hyperlink "www.greetingcardco.com," which is associated with the phrase, from the data structure 62. The client can now use the supplemental data to activate an enhancing action which enhances the primary content, such as displaying the hyperlink on the screen along with the primary content.

According to an aspect of the invention, the client employs multicasting as an interprocess communication technique. At step 134 in FIG. 7, the parser 110 sends the supplemental data to a multicast address monitored locally by the client. The parser 110 then continues to the next word group (step 130 in FIG. 7).

Meanwhile, the HTML container with the program enhancement listener 112 listens to the multicast address to receive the supplemental data (step 136 in FIG. 7). Upon receiving the supplemental data, the listener operates on the supplemental data to perform the enhancing action, such as displaying a hyperlink, or launching an application, or displaying supplemental data concurrently on the screen with the primary data (step 138 in FIG. 7). In this manner, the enhancement action is synchronized with the particular scene in which the dialog "oh hi how are you" takes place.

More specifically, the listener is preferably implemented as an ActiveX™ control which sits in a container, such as the HTML page, or an application. ActiveX™ is a technology developed and marketed by Microsoft Corporation. ActiveX™ controls are described in detail in a book entitled, *Exploring ActiveX*, by Shannon R. Turlington, Ventana Communications Group, Inc., copyright 1996, which is hereby incorporated by reference. The listener examines the supplemental data received at the multicast address and decides what action to take.

The supplemental data can be encoded to indicate its type. For example, supplemental data in plaintext means it is a hyperlink (e.g., www.greetingcardco.com); supplemental data enclosed in quotes means it is an executable file (e.g., "application.exe"); and supplemental data enclosed in curly brackets means it is a trigger for arbitrary text or graphical data (e.g., {text}). Depending upon the type of supplemental data, the listener takes one of the following actions: (1) instructs a Web browser to bring up a URL, (2) expose the arbitrary message directly to the container, or (3) launch an application. The type identifiers explained above are examples, as any arbitrary convention for identifying data type may be used.

With the multicast listener and interprocess communication technique, the enhancement action is decoupled from the parser activity for detecting key phrases. This is advantageous from a production standpoint as it permits the enhanced content producers to concentrate solely on the enhancing content to be activated by the supplemental data, without regard to how and when the parser detects the key phrases or retrieves the supplemental data.

The invention is advantageous in that it leverages the existing closed captioning available in most programs as a timing mechanism for synchronizing enhancing content with the primary content. With this method, the program can be started mid-stream and the enhancing content for the remaining portion will still be timely cued at appropriate junctures of the primary content.

The implementation described above is explained in the context of receiving broadcast programs, such as television shows, from a broadcast network and the enhancing content from content servers on the Internet. This is but one example as other example implementations exist. For instance, another example might be to locally supply the primary content and closed captioning script from a video cassette and the supplemental data from a separate computer disk, such as a CD-ROM.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for synchronizing enhancing content with primary content having a closed captioning script, comprising the following steps:
   relating supplemental data used to activate the enhancing content to key phrases of the closed captioning script;
   detecting the key phrases from the closed captioning script during presentation of the primary content; and
   activating the enhancing content according to the supplemental data related to the detected key phrases without user interaction to synchronize the enhancing content with the primary content.

2. A method as recited in claim 1, wherein the relating step comprises associating the supplemental data with the key phrases in a data file.

3. A method as recited in claim 1, wherein the detecting step comprises examining sequential groupings of words in the closed captioning script to identify the key phrases.

4. A method for synchronizing enhancing content with primary content having a closed captioning script, comprising the following steps:
   relating a hyperlink for a target resource containing enhancing content to key phrases of the closed captioning script;
   detecting the key phrases from the closed captioning script during presentation of the primary content; and
   activating the hyperlink related to the detected key phrases without user interaction to synchronize the enhancing content with the primary content.

5. A method as recited in claim 1, wherein the supplemental data comprises executable code, and the activating step comprises the step of launching the executable code.

6. A method as recited in claim 1, wherein the activating step comprises the step of displaying the supplemental data concurrently with the primary content.

7. A method as recited in claim 4, further comprising the following steps:
   presenting the primary content within a hypermedia document; and
   controlling placement of the primary content within the hypermedia document using the supplemental data.

8. A method as recited in claim 1, wherein the key phrases comprise sequences of words in the closed captioning script.

9. A method as recited in claim 1, wherein the key phrases comprise character strings in the closed captioning script.

10. Computers programmed to perform the steps of the method as recited in claim 1.

11. Computer-readable media having computer-executable instructions for performing the steps of the method as recited in claim 1.

12. A method for producing an enhanced program in which supplemental data is made available to enhance primary content, the primary content containing a closed captioning script, comprising the following steps:
    determining, during production of an enhanced program, a key phrase in the closed captioning script; and
    associating the supplemental data to the key phrase in the closed captioning script during the production.

13. A method as recited in claim 12, wherein the determining step comprises deriving multiple key phrases which each have the same phrase length.

14. A method as recited in claim 12, wherein the determining step comprises compiling a set of unique key phrases from the closed captioning script, each key phrase having the same number of words.

15. A method as recited in claim 12, further comprising the following steps:
    marking spots in the closed captioning script for presentation of enhancing content; and
    the determining step comprises determining the key phrases at the spots in the closed captioning script.

16. A method as recited in claim 12, further comprising the step of generating a data file containing the supplemental data associated with the key phrase.

17. A storage medium storing the data file constructed according to the steps in the method as recited in claim 16.

18. A computer programmed to perform the steps of the method as recited in claim 12.

19. A computer-readable media having computer-executable instructions for performing the steps of the method as recited in claim 12.

20. A method for enhancing primary content having a closed captioning script, comprising the following steps:
    detecting a key phrase in the closed captioning script, the key phrase being related to enhancing content; and
    enhancing the primary content with the enhancing content related to the detected key phrase without user interaction to synchronize the enhancing content to the primary content.

21. A method as recited in claim 20, wherein the detecting step comprises:
    examining sequential groupings of words in the closed captioning script to identify the key phrases; and
    comparing the groupings of words with a preconstructed list of key phrases to identify the key phrases in the closed captioning script.

22. A method for enhancing primary content having a closed captioning script, comprising the following steps:
    detecting a key phrase in the closed captioning script, the key phrase being related to enhancing content; and
    activating a hyperlink to a target resource related to the detected key phrase without user interaction to synchronize enhancing content from the target resource with the primary content.

23. A method as recited in claim 20, wherein the enhancing step comprises the step of launching executable code.

24. A method as recited in claim 20, wherein the enhancing step comprises the step of concurrently displaying the primary and enhancing content.

25. A method as recited in claim 22, further comprising the following steps:
    presenting the primary content within a hypermedia document; and
    controlling placement of the primary content within the hypermedia document using the enhancing content.

26. A computer programmed to perform the steps of the method as recited in claim 20.

27. A computer-readable media having computer-executable instructions for performing the steps of the method as recited in claim 20.

28. A method for enhancing a video program having a closed captioning script, comprising the following steps:
    determining a key phrase in the closed captioning script;
    associating supplemental data to the key phrase in the closed captioning script;
    creating a key phrase data file which contains the key phrase and the associated supplemental data;

delivering the key phrase data file to a viewer computing unit;

playing the video program at the viewer computing unit;

detecting the key phrase in the closed captioning script;

obtaining the supplemental data associated with the key phrase from the key phrase data file; and executing an enhancement action without user interaction according to the obtained supplemental data to synchronize the enhancement action with the video program.

29. A method for enhancing a video program having a closed captioning script, comprising the following steps:

determining a key phrase in the closed captioning script;

associating a hyperlink to a target resource to the key phrase in the closed captioning script;

creating a key phrase data file which contains the key phrase and the associated hyperlink;

delivering the key phrase data file to a viewer computing unit;

playing the video program at the viewer computing unit;

detecting the key phrase in the closed captioning script;

obtaining the hyperlink associated with the key phrase from the key phrase data file; and activating the hyperlink to the target resource to synchronize an enhancement action with the video program.

30. A method as recited in claim 28, wherein the supplemental data comprises executable code, and the executing step comprises the step of launching the executable code.

31. A method for enhancing a video program having a closed captioning script, comprising the following steps:

determining a key phrase in the closed captioning script;

associating supplemental data to the key phrase in the closed captioning script;

creating a key phrase data file which contains the key phrase and the associated supplemental data;

delivering the key phrase data file to a viewer computing unit;

playing the video program at the viewer computing unit;

detecting the key phrase in the closed captioning script;

obtaining the supplemental data associated with the key phrase from the key phrase data file; and displaying the supplemental data in synchronization and concurrently with the video program.

32. A method for enhancing a video program having a closed captioning script, comprising the following steps:

determining a key phrase in the closed captioning script;

associating supplemental data to the key phrase in the closed captioning script;

creating a key phrase data file which contains the key phrase and the associated supplemental data;

delivering the key phrase data file to a viewer computing unit;

playing the video program at the viewer computing unit;

presenting the video program within a hypermedia document;

detecting the key phrase in the closed captioning script;

obtaining the supplemental data associated with the key phrase from the key phrase data file; and controlling placement of the video program within the hypermedia document using the supplemental data.

33. A method as recited in claim 28, wherein the executing step comprises the following steps:

multicasting the enhancement action to a multicast address;

listening to the multicast address to receive the enhancement action; and performing the enhancement action.

34. Computers programmed to perform the steps of the method as recited in claim 28.

35. Computer-readable media having computer-executable instructions for performing the steps of the method as recited in claim 28.

36. A storage medium storing the key phrase data file constructed according to the steps in the method as recited in claim 28.

37. A system for synchronizing enhancing content with primary content having a closed captioning script, comprising:

means for relating supplemental data to key phrases of the closed captioning script, the supplemental data being used to activate the enhancing content;

means for detecting the key phrases from the closed captioning script during presentation of the primary content; and means for automatically activating the enhancing content according to the supplemental data related to the detected key phrases without user interaction to introduce the enhancing content at times approximately concurrent with occurrence of the key phrases in the primary content.

38. A system for producing an enhanced program in which supplemental data is made available to enhance a video program, the video program containing a closed captioning script, comprising:

a key phrase identifier to identify one or more key phrases from the closed captioning script;

a key phrase linker to associate the supplemental data to the one or more key phrases identified from the closed captioning script by the key phrase identifier; wherein the key phrase linker multicasts the supplemental data to a multicast address; and a multicast listener to receive the supplemental data sent to the multicast address.

39. A system as recited in claim 38, wherein the key phrase identifier comprises a parser.

40. A system as recited in claim 38, wherein the key phrase identifier comprises a parser configured to produce a set of unique phrases having the same phrase length.

41. A system as recited in claim 38, wherein the key phrase linker creates a data file having the key phrases associated with the supplemental data.

42. A system as recited in claim 38, further comprising a processor and a data storage medium, wherein the key phrase identifier, the key phrase linker, and the multicast listener comprise computer-executable instructions stored in the data storage medium and executable on the processor.

43. For use with a viewer computing unit having a data storage medium and a processor, a program enhancement system for enhancing a video program having a closed captioning script, the program enhancement system comprising:

an association table stored in the storage medium, the association table containing key phrases in the closed captioning script listed in association with supplemental data used to enhance the video program; and a key phrase detector executable on the processor to monitor the closed captioning script as the video program is playing and to detect the key phrases listed in the association table, whereupon detection of a particular key phrase and without user interaction, the association table can be accessed to retrieve the supplemental data associated with the particular key phrase to synchronize utilization of the supplemental data with a specific spot in the video program corresponding to the particular key phrase.

44. A program enhancement subsystem as recited in claim 43, wherein the key phrase detector comprises a parser.

45. A program enhancement subsystem as recited in claim 43, wherein the key phrase detector examines successive groups of sequential words in the closed captioning script and compares each group to the key phrases in the association table to detect occurrence of the key phrases in the closed captioning script.

46. For use with a viewer computing unit having a data storage medium and a processor, a program enhancement system for enhancing a video program having a closed captioning script, the program enhancement system comprising:

an association table stored in the storage medium, the association table containing key phrases in the closed captioning script listed in association with supplemental data used to enhance the video program, wherein the supplemental data comprises data selected from a group comprising a hyperlink to a target resource, text data, graphical data, and executable code; and a key phrase detector executable on the processor to monitor the closed captioning script as the video program is playing and to detect the key phrases listed in the association table, whereupon detection of a particular key phrase, the association table can be accessed to retrieve the supplemental data associated with the particular key phrase to synchronize utilization of the supplemental data with a specific spot in the video program corresponding to the particular key phrase.

47. For use with a viewer computing unit having a data storage medium and a processor, a program enhancement system for enhancing a video program having a closed captioning script, the program enhancement system comprising:

an association table stored in the storage medium, the association table containing key phrases in the closed captioning script listed in association with supplemental data used to enhance the video program;

a key phrase detector executable on the processor to monitor the closed captioning script as the video program is playing and to detect the key phrases listed in the association table, whereupon detection of a particular key phrase, the association table can be accessed to retrieve the supplemental data associated with the particular key phrase to synchronize utilization of the supplemental data with a specific spot in the video program corresponding to the particular key phrase, the key phrase detector multicasting the supplemental data to a multicast address; and a multicast listener executable on the processor to receive the supplemental data sent to the multicast address.

48. For use with a viewer computing unit having a processor, a program enhancement subsystem for enhancing a video program having a closed captioning script, the program enhancement subsystem comprising:

a detector executable on the processor to monitor the closed captioning script as the video program is playing and to detect supplemental data embedded in the closed captioning script, whereupon detection and without user interaction, the processor executes an enhancement action based on the supplemental data to synchronize the enhancement action with a specific spot in the video program corresponding to the placement of the supplemental data within the closed captioning script.

49. A computer-readable memory having a key phrase data structure, the key phrase data structure comprising:

a key phrase data field containing key phrases abstracted from a closed captioning script of a video program;

a supplemental data field containing supplemental data for enhancing a video program; and the key phrase data structure being organized so that the supplemental data in the supplemental data field is associated with corresponding key phrases in the key phrase data field.

50. A computer-readable memory as recited in claim 49, wherein each key phrase has the same number of words, the key phrase data structure further comprising a minimum phrase length data field containing a length of each key phrase.

\* \* \* \* \*

UNITED STATES PATENT AND TRADEMARK OFFICE
CERTIFICATE OF CORRECTION

PATENT NO. : 6,637,032 B1 Page 1 of 1
DATED : October 21, 2003
INVENTOR(S) : Feinleib It is certified that error appears in the above-identified patent and that said Letters Patent is hereby corrected as shown below:

Column 1,
Line 57, delete "is" between "Internet" and "which".

Signed and Sealed this

First Day of March, 2005

JON W. DUDAS
*Director of the United States Patent and Trademark Office*